(12) United States Patent
Nagel et al.

(10) Patent No.: US 9,118,754 B2
(45) Date of Patent: Aug. 25, 2015

(54) SYSTEM AND METHOD FOR PROVIDING A PUBLIC/PRIVATE TELEPHONE NUMBER SYSTEM

(76) Inventors: Robert H. Nagel, New York, NY (US);
Phillip Jones, Princeton, NJ (US);
Clifford Wener, Springfield, NJ (US);
Jodd Readick, New York, NY (US)

( * ) Notice: Subject to any disclaimer, the term of this patent is extended or adjusted under 35 U.S.C. 154(b) by 2185 days.

(21) Appl. No.: 11/549,218

(22) Filed: Oct. 13, 2006

(65) Prior Publication Data

US 2007/0121863 A1 May 31, 2007

Related U.S. Application Data

(60) Provisional application No. 60/727,707, filed on Oct. 18, 2005, provisional application No. 60/749,525, filed on Dec. 12, 2005.

(51) Int. Cl.
*H04M 7/00* (2006.01)
*H04M 3/42* (2006.01)

(52) U.S. Cl.
CPC .................... *H04M 3/42008* (2013.01)

(58) Field of Classification Search
USPC .............. 379/219, 220.01, 221.01, 221.14, 379/211.01–211.02, 210.02, 207.02, 207.13
See application file for complete search history.

(56) References Cited

U.S. PATENT DOCUMENTS

| | | | |
|---|---|---|---|
| 4,661,974 A * | 4/1987 | Bales et al. ................ 379/198 |
| 5,483,586 A * | 1/1996 | Sussman ................ 379/218.01 |
| 5,541,988 A * | 7/1996 | Draganoff ................ 379/354 |
| 5,901,209 A * | 5/1999 | Tannenbaum et al. ... 379/142.09 |
| 6,009,177 A * | 12/1999 | Sudia ................ 713/191 |
| 6,259,908 B1 * | 7/2001 | Austin ................ 455/411 |
| 6,343,120 B1 * | 1/2002 | Rhodes ................ 379/142.01 |
| 6,453,164 B1 * | 9/2002 | Fuller et al. ................ 455/445 |
| 6,611,689 B1 * | 8/2003 | Cartigny et al. ................ 455/461 |
| 7,013,132 B2 * | 3/2006 | Kehr ................ 455/415 |
| 7,565,159 B2 * | 7/2009 | Karia et al. ................ 455/461 |

(Continued)

OTHER PUBLICATIONS

U.S. Appl. No. 60/631,002, filed Nov. 24, 2004, Applicant Name: Black et al.

(Continued)

*Primary Examiner* — William Deane, Jr.
(74) *Attorney, Agent, or Firm* — Ward & Zinna, LLC (57) ABSTRACT

This invention shows a method for operating a voice communications network that comprises dynamically associating a private number with at least one public number of a circuit-switched voice communication network, authenticating a user of a private number without reliance on a static reproducible data code, receiving an incoming call to the public number and routing the incoming call from a caller to the private number. The method also shows the generation of an outgoing call from the private number and passing the outgoing call through the public number while generating calling party information to a target which preserves the privacy of the caller, and altering an associating of the private number and at least one public number. The system therefore acts as a proxy with authentication by means of dynamic code security. The caller and the user of the private number share seamless round-trip telephone communications while preserving the anonymity of the user of the private number. The system functionality is advantageously presented as a restricted option space defined by a "skin", which provides a consistent and purposeful set of functionality useful for a predetermined population of users.

30 Claims, 1 Drawing Sheet

(56) References Cited

U.S. PATENT DOCUMENTS

| | | | |
|---|---|---|---|
| 7,586,898 B1 * | 9/2009 | Koch et al. | 370/352 |
| 7,587,462 B2 * | 9/2009 | Zmudzinski et al. | 709/207 |
| 7,602,894 B1 * | 10/2009 | Shaffer et al. | 379/210.02 |
| 7,756,257 B2 * | 7/2010 | Kucmerowski et al. | 379/88.17 |
| 7,944,870 B2 * | 5/2011 | Varland | 370/313 |
| 8,280,021 B2 * | 10/2012 | Sanchez | 379/201.01 |
| 2003/0147519 A1 * | 8/2003 | Jain et al. | 379/211.02 |
| 2004/0264410 A1 * | 12/2004 | Sagi et al. | 370/331 |
| 2006/0092917 A1 * | 5/2006 | Kucmerowski et al. | 370/352 |
| 2006/0140200 A1 * | 6/2006 | Black et al. | 370/401 |
| 2006/0147022 A1 * | 7/2006 | Karnalkar et al. | 379/221.08 |
| 2007/0155435 A1 * | 7/2007 | Billmaier et al. | 455/565 |

OTHER PUBLICATIONS

U.S. Appl. No. 60/718,620, filed Sep. 19, 2005, Applicant Name: Black et al.

* cited by examiner

SYSTEM AND METHOD FOR PROVIDING A PUBLIC/PRIVATE TELEPHONE NUMBER SYSTEM

BACKGROUND OF THE INVENTION

Systems and methods for connecting circuit switched voice communications between a caller and a callee are well known. In a traditional circuit switched telephone model, each participant has a separate physical connection to a central office, identified by a "telephone number". This number can be referred to as a "public" number, because it is used either as a common or standardized identifier to connect a circuit, or as a caller identification.

One traditional method for obtaining anonymity was to employ an "unpublished" telephone number. This, however, had significant limitations: a potential caller could not contact a callee unless given the number in advance; but once given the number, the caller had permanent access to the callee. The advantage of an unpublished number relied on its secrecy, and once the secret was breached, the number was effectively public.

Another method for achieving anonymity or privacy is through the use of a disposable cellular telephone. This, however, can be costly, and suffers from significant limitations as well. In particular, the disposal of the cell phone results in loss of the telephone number, and thus this provides only a temporary solution, because the user must reestablish his number with all those wishing to contact him each time he changes to a different cell phone.

Anonymous telephone communications provide a number of advantages and market opportunities. See, "Anonymous Phone Calling: An Overview of Anonymous Phone Call Service Providers for the Consideration of Online Personals Companies", Mark Courtland Brooks (version 1.0, Nov. 1, 2005).

U.S. Pat. No. 5,901,209, expressly incorporated herein by reference, provides a system and method for selectively adjusting the caller identification of a calling party based, in part, on parameters associated with adjusting the calling party. Security codes can be used in conjunction with a database to insure that the substituted ID is legitimate. The one embodiment or network-based predictive dialer is used to place calls for agents geographically separated from both the network and other agents. The network system instigates a calling campaign where remote agents are connected through the network to called parties and the called party receives the caller ID information pertaining to the calling campaign and not the caller ID of the agent.

U.S. Pat. No. 6,560,329, expressly incorporated herein by reference, provides an automatic call distribution system which routes calls from a communications network that provides call arrival data and a controllable routing capability. The system includes several agent stations, a call server, and a routing controller. Each agent station has a processor and a communication element to receive calls routed thereto. The call server uses telephony lines to receive the call arrival data and to direct the routing capability of the network. The call server has a caller prompting unit to request and receive information from a caller. The call server generates call information from the information from the caller and/or the call arrival data. The routing controller receives agent status data from the agent stations and the call information and selects an agent station from the call information and the agent status data. The routing controller causes the call server to direct the network to route the call to the selected agent station.

U.S. Pat. No. 6,741,688, expressly incorporated herein by reference, relates to an electronic method and apparatus for handling telephone calls. The method includes storing a telephone number template in a memory. The template preferably is as wide as a telephone number is long and identifies one or more telephone number digits by the digit positions within a telephone number field for comparison purposes. The method further includes monitoring a telephone line for a call placed thereon, identifying at least one of the origin and destination telephone numbers and storing one or more digits of such identified telephone number in a memory. The method further includes comparing the stored digits of the identified telephone number with the corresponding digits of the stored template. Finally, the method includes processing the call based upon the result of said comparing. Such processing may include any one or more of logging, filtering, blocking, ignoring, rerouting, forwarding, and distinctive-ringing and answering the call. The template may include a first-level mask-identifying digit position criterion that identifies dialing tokens of interest, and a second-level target-identifying digit content criterion that attempts to pattern-match those tokens of interest with corresponding tokens of stored telephone numbers.

U.S. Pat. No. 6,873,696, expressly incorporated herein by reference, relates to a method and system for preserving caller privacy in an advanced intelligent network comprising a service switching point and a second service switching point. The service switching point is adapted to suspend calls directed to a predefined number and to forward signaling information associated with the call to the service control point. The service control point is adapted to alter the signaling information if a privacy restriction indicator in the signaling information is activated and to forward the altered signaling information to the service switching point. The method comprises: forwarding information identifying a calling party and any privacy restrictions on the calling party information from the service switching point to the service control point; and if the privacy restrictions indicate that the calling party information should not be delivered to the called party, altering the calling party information and forwarding the altered information to the service switching point.

U.S. Pat. No. 6,882,722, expressly incorporated herein by reference, relates to a virtual private communications network (VPCN) and method of managing calls on the network. Stations on a private communications network are identified by a unique private network identification (ID) code or a dial-in-direct (DID) number. Remote communications devices (e.g., cell phones, analog phones, etc.) are virtual client devices connected from a public communications network to the private communications network. One or more DID numbers are shared DID numbers, dedicated for the virtual client devices. Calls from the virtual client devices may be placed to network stations by dialing shorthand (e.g., 5 or fewer digits) numbers. Each call has a dedicated DID number temporarily assigned to it for placing the call as an in-network call. Once the call reaches its final destination, the shared DID number is released for temporary assignment to other virtual client devices.

In the present invention, a telephone number which is kept secret as described above is referred to as a private number. A telephone number which is published or generally known or ascertainable, is referred to as a public number.

DEFINITIONS

The following definitions are applicable herein:

System—the Telephony System described here

The System has, for example, the following components: Interactive Voice Response (IVR), Unified Messaging—superset of voicemail (UM), Signaling System 7—a telephony standard (SS7), and web access for various functions.

Account

The Account refers to a particular account on the System. Each particular call is associated with a particular public number or becomes inactive when the public number is disabled for both incoming and outgoing calls.

CPN—Calling Party Number

The CPN is the telephone number that appears on the receiving party's telephone set if it has a display to show the calling party's telephone number. The CPN is not always displayed, for example, if the calling party blocks its appearance.

CPI—Calling Party Identification

The CPI information includes the calling party name as well as the CPN. The CPI appears on the receiving party's telephone set if it has a display to show this information. CPI information is not always available from the telephone company.

Pen Data

Pen data historically has been used for all the data a telephone technician could "pen" about a particular telephone call. As used herein, it includes all data that can be collected from the telephone company along with System data, time data, and relevant data from other databases.

Skin

This term was developed for Internet sites, wherein the skin literally determines not only the look and feel of the game web site but also what features and parameters are available there.

Skin encompasses the entire customer experience with the system. For example, the System skin may refer to the complete customer experience with all components of the System as listed under this definition. The features described in this document may not be simultaneously available. They are available through a skin of a particular application, which reveals the necessary parameter set for this skin.

Public Number

The public number is a telephone number provided by the System. It can be given to the public, to a few associates, or to a single person. By itself, it does not reveal the private number or the identity of the number holder. It may expire after the purchased number of minutes is used, after a predetermined amount of time has elapsed, or at the will of the holder. The holder may wish to inactivate incoming calls, outgoing calls, or both. As part of the administrative set up, the number holder optionally may choose the area code of the public number. All calls are made to the public number, and all calls originate from the public number as revealed by the CPN sent to the calling party.

Private Number

The private number is a telephone number held private by the holder and not revealed by the outgoing CPN, which is displayed as the public number, the source of the call. The number holder may elect to use up to six more private numbers associated with his public number. The private numbers are owned by, or under the control of the number holder; all other telephone numbers are provided by the System.

Outgoing Number

The outgoing number is the telephone number called by the number holder to originate a call. Preferably it is a toll free number such as an 800 number. After authorization, control is passed to the public number to complete the call. The outgoing number also can be used by the number holder to alter the parameters of his account after he has completed his authentication.

Outgoing Security Level

This variable is set for each account. According to one embodiment, if it is set to high, the holder must enter the public number and the pass name each time he calls the outgoing number. If it is set to medium, he only has to enter the pass name. If it is set to low, he enters only the public number. If it is set to none and there is only one public number associated with the private number, he does not need to enter either variable as long as his CPN is exposed to the outgoing number. It is possible to customize this setting for each private number associated with the account.

General Account

A general account may contain several accounts when an entity has established a credit account and wishes to have several public numbers billed to the same account. In such case it may not be necessary to purchase a special "telephone calling card".

Professional Account

A special type of general account may be established by professionals, such as licensed private investigators. The accounts under a professional account have access to more options because of the professional responsibilities of the holder.

Tag

The tag is a number from one to nine digits, selected by the holder, which is used as a reminder about the particular public number the calling party has selected. If each of several possible callers has been given a separate public number, the tag can be used to identify the caller no matter what telephone he has called from. For a professional account, the tag could be the case number associated with this Public Number.

As an option, the tag can be used in place of the public number when originating an outgoing call, thus making it the same as the tag from an incoming call to the same public number. In this event, it provides additional mnemonic assistance in differentiating between various public numbers associated with a single private number. The tag can be sent as a proxy or added at the beginning or end of the CPN sent to the private number as a further reminder of the caller's identity.

Called Number

The called number is the telephone number called by the public number. The CPN of the public number is passed to the called number.

Number Holder/Holder

The number holder is the person or entity which establishes and controls the account. The term is sometimes abbreviated as "holder." Nothing in the System prevents a person from maintaining more than one public number, each with its associated account and optional tag. Unused minutes can be transferred between accounts.

Password

The password is a sequence of keystrokes or symbols, typically between three and five numbers.

Prompt

The prompt is the acoustical sound given to the holder to elicit a response after calling the outgoing number.

B—Bong

This symbol stands for a "bong" sound. BB indicates two successive "bongs," etc. It is used as a prompt to elicit input.

Prompt Reminder

The prompt reminder is an explanation of the prompt, which can be accessed, for example, by pressing the "0" key immediately after the prompt.

Special Function

A special function is determined by two touchtone keystrokes (numbers) entered where the holder would normally enter the outgoing number.

SUMMARY OF THE INVENTION

The present invention provides a system and method for operating a voice communications network, which dynamically associates a private number with at least one public number of a circuit switched voice communication network; receives an incoming call to the public number, and routing the incoming call to the private number; generates an outgoing call from the private number, and passing the outgoing call through the public number, while generating calling party information to a target which preserves a privacy of the caller. The association of the private number and the at least one public number may be periodically or dynamically altered. The user of a private number may be authenticated, for example by a static reproducible code, such as a personal identification number, or without reliance on a static reproducible data code, the use of which, while expedient, may present security risks. User authentication is also preferred for control and/or configuration tasks.

In accordance with a further aspect of the invention, a system and method for operating a voice communications system is provided, comprising providing a first option set for dynamically associating at least one private number with at least one public number of a voice communication network, according to a predetermined algorithm, for contacting a user; providing a second option set for dynamically associating at least one public number with at least one private number of a voice communication network, according to a predetermined algorithm, for permitting the user to contact others; providing a third option set for defining functions available if a call to the user is not completed; and defining a restricted option space within each of the first option set, second option set, and third option set, for controlling system behavior, the restricted option space having at least two option sets, each option set differently controlling the system, and being selectively applied to the user.

The present invention also provides a system and method for operating a voice communications network, comprising dynamically associating at least one private number with at least one public number of a circuit switched voice communication network, according to a predetermined algorithm; receiving an incoming call to one of said public numbers, and routing the incoming call to at least one of said private numbers; generating an outgoing call from a private number, and passing the outgoing call through at least one of said public numbers, while optionally generating calling party information to a target which preserves a privacy of the caller; and at least once altering said dynamic association or algorithm of said at least one private number and said at least one public number.

In accordance with various aspects of the invention, an outcome of said predetermined algorithm is sensitive to at least one of a time, a communication status, a status of one or more of a public and/or private number, an external status, accounting information, system congestion, communication cost, and a location. Therefore, by determining the status of one of these external states, the function of the system may be controlled. In addition, a user input may be received to influence the dynamic association. The system may verify a validity of an association of a public number and a private number. Further, a preferred implementation determines a status of at least one of said private numbers, and performs the association in dependence on said determined status.

The at least one of said at least one private number may be provided an automated storage facility. A user interface may be provided for facilitating receipt of configuration information from a user, said configuration information influencing said dynamic association. An interactive voice response interface may be provided for at least one of a user at a public number and a user at a private number. Communications are preferably logged, and more particularly, communications involving at least one private number may be logged and reported separately.

The user is preferably authenticated before permitted use of a private number, control and/or configuration tasks. The authentication may be through a password, dynamically changing code, biometric identifier, based on a cryptographic key which changes over time or after use, or otherwise.

A system and method is provided in accordance with various aspects of the invention, for operating a voice communications network that comprises dynamically associating a private number with at least one public number of a circuit-switched voice communication network, authenticating a user of a private number without reliance on a static reproducible data code, receiving an incoming call to the public number and routing the incoming call to the private number, generating an outgoing call from the private number and passing the outgoing call through the public number while generating some calling party information to a target which preserves the privacy of the caller, and altering an associating of the private number and at least one public number. The system therefore acts as a proxy with authentication by means of dynamic code security. The caller and the owner of the private number share seamless round-trip telephone communication while preserving the anonymity of the owner of the private number. The system functionality is advantageously presented as a restricted option space defined by a "skin", which provides a consistent and purposeful set of functionality useful for a predetermined population of users.

The system according to the present invention preferably comprises a computerized switch which directly controls communications channels and/or packets, such as the public switched telephone network and/or voice over Internet Protocol, or a separate processor, for example having its own processor, volatile memory, program memory, database, and communications channel(s) to such a switch. In either case, the functionality is typically implemented as program instructions for a general purpose processor stored on a tangible storage medium, such as non-volatile semiconductor memory (Ferroelectric memory, Flash memory, EEPROM, etc.), magnetic memory (e.g., hard disk, MRAM), optical memory (CD or DVD), or other suitable media. The instructions may also be represented as electromagnetic waves communicated through a medium which supports such communications, such as cable, fiber optics, free space, etc. The system is preferably multi-tasking, and may comprise multiple processors, or loosely or tightly coupled parallel processors or processing cores, networks, or grids. Thus, for example, a processor executing the instructions to practice a method in accordance with the present invention may be couples to a so-called SS-7 switch, which processor, in turn, receives control instruction s and data through the Internet (or other data communications network) from another peer processor, or a remote server. This architecture, for example, allows a central database to provide a single portal for user registration, interaction, and control, while allowing distributed and/or redundant hardware to implement the telephony functionally. The system may also comprise dedicated, special purpose, or hard-wired hardware to perform the various methods.

In accordance with various aspects of the invention, Public/private numbers are used in a variety of situations. For example, in a public/private encryption key pair, the public key is made public to one or more persons who wish to send an encrypted message to the holder of the key pair. The private key is kept secret by the holder and is used to decrypt incoming messages. The public number in the telephony system described here is likewise given to one or more persons wishing to communicate telephonically to the number holder. The private number in this telephony system is kept secret to provide benefits to the number holder. Unlike the encryption model, the public number does not carry any information about the holder and can be used to preserve anonymity both for the holder and the private number.

The System is a "round trip" telephony system. It is straightforward to call one number and ring another by "call forwarding" the called number to the final number. There are also services which offer the insertion of another number into the CPN to hide where the calling party is actually calling from. The System, however, combines both of these concepts and still retains the privacy of the private number. All calls are made to the public number, and all calls originate from the public number as revealed by the CPN.

Without changing his private number, the holder has a "disposable" telephone number. The associated public number is disposable in that it can be terminated at any time, and remaining minutes can be transferred to a new public number.

In order maintain a high level of security, one embodiment of this system requires the holder to provide authentication, such as a spoken pass name. Another party calling from the private number to the public number with complete knowledge of the sequence of telephone keys pressed, cannot access the System without this information. Alternately, a rolling code or known two-factor or three-factor authentication scheme using a time or usage-sensitive key generator may be employed to prevent replay attacks.

Incoming calls to the public number are: forwarded seamlessly to the private number, sent to a voicemail device, given a busy signal, rung continuously for a period of time, given a "no longer in service" message, or given individualized "treatments". Separate actions can be directed in the case of a "busy" or "no answer" signal from the private number, which may direct action to an auxiliary private number or a unified messaging system. These options are all under the control of the number holder within the constraints of the particular application implemented (skin). The holder can also determine whether an incoming call to the public number shows up on the display of his private number as: "Number Unavailable," the CPN of the public number, the CPI of the calling party, or the chosen tag. The tag may optionally be inserted prior to the CPN or at the end of the CPN, separated by a "0" for easy recognition. As a further mnemonic device, the tag can be used in outgoing calls in place of the entry of the public number.

The present invention therefore provides a system in which telecommunications routing logic is not inextricably linked to physical communications links or predetermined and persistent communications channel or endpoint identifications. Rather, the system can be flexibly implemented to provide enhanced features to communications systems which employ, circuit switch architectures and/or which emulate attributes of such architectures. Likewise, the system permits a full range of computer intelligence and packet switch data network technologies to be employed within an environment consistent with use of legacy, VOIP, cellular telephones, or other modern telephone systems.

BRIEF DESCRIPTION OF THE DRAWINGS

The invention will now be explained by way of the drawings, in which.

DETAILED DESCRIPTION OF THE PREFERRED EMBODIMENT

Figure 1:
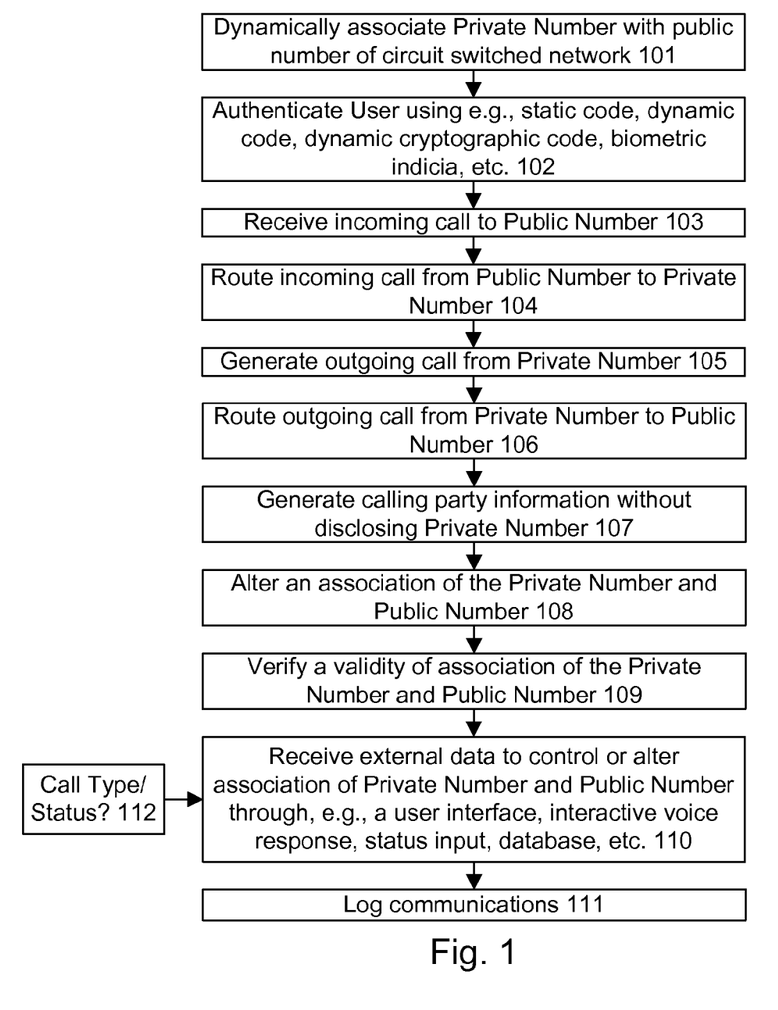
FIG. 1 is a flowchart showing aspects of a method according to the present invention.

A flowchart showing major aspects of the invention is shown in FIG. 1. The method provides that a database is maintained which stores association information between private numbers, i.e., those communications circuits which are to remain unidentified to a call target, and public numbers, called number for incoming calls and the caller identification information for outgoing calls 101. These associations are dynamic, meaning that the association is not permanent, as would be the case of an association of a normal telephone circuit, its published telephone number, and caller ID information generated through outbound use of that circuit.

In use, a call may be received to a public number 103, which is then routed to a private number 104. Conversely, a caller may initiate a call from a private number 105, which is routed to a callee 106 displaying caller ID information which is different from an identification of the private number, this reserving the privacy 107

The user may be authenticated before permitted use of certain features 102, such as administrative and control functions, and use of a private number. One such function is an alteration of an association between the private numbers and public numbers 108. The system may verify a validity of an association between private and public numbers 109. The routing functions may be defined by a routing table, or be adaptively defined base on various data 110, such as call type or status 112. Communications may be logged 111. For example, usage of private numbers may be separately accounted from the use of public numbers.

Figure 2:
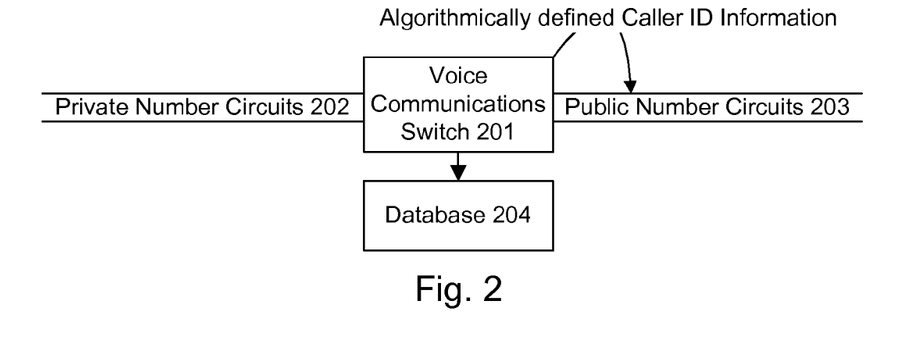
FIG. 2 shows a simplified block diagram of the invention.

FIG. 2 shows a block diagram of the invention. A voice communications switch 201 routes calls through various private number circuits 202 and public number circuits 203. A database 204 stores parameters for use by an algorithm which determines the routing function.

Skins as Classes of Service

The basic system architecture provides a high degree of flexibility and power. However, much of that power can be harnessed by establishing sets of features and making decisions in advance as to how features should be implemented, thus bundling the functionality. The result is termed herein a "skin". That is, the generic basic architecture can be presented to a user as a mature and well thought-out implementation, with relative ease. This, in turn, permits service providers to differentiate their product offerings and to establish bundle pricing, even when based on the same platform. Likewise, the use of skins may allow a provider to aggregate demand, and thus achieve lower costs.

The skins may be relatively simple: for example, a vector which either refers to a database entry or parameter set, or which itself comprises the set of configurations and parameters that form the skin. In some cases, the skin may be composed of multiple levels of hierarchal objects in which a higher level establishes a subset of the option space, while a lower level particularly defines the options to be employed.

Another advantage of skins is that they facilitate customer support and the creation of documentation, FAQs, and help files. Thus, while a complete technical manual may be provided for the system, it is generally far more complex than necessary for users and would create opportunity for intentional or unintentional mischief. However, by limiting the options and controlling their interrelation, it is much easier to assist users in both configuring and using the system.

Certain of the examples discussed herein are presented as though the holder chose all the options. This, however, is not a limitation on the invention. Such options may be conveniently identified and selected together as a group by choice or limitation of the skin. For example, the skin could allow only one private number, allow outgoing tags, choose to get the tag placed in front of the CPN, force the outgoing security level=none, hide all the other options, and allow a single session request of several public numbers and their associated tags along with helpful suggestions. A selection of cell carriers could be presented so that upon making a choice, the SMS email message would automatically be generated and placed into the table.

Example 1

Consider a single private number which has three associated public numbers. The holder uses one public number for his business and sets its tag to 1. He uses the second public number for the soccer team he coaches and sets its tag to 2. He uses the third public number for his parents, who live in another part of the country, and sets its tag to 3. As a convenience to his parents, he selects as the area code for this third public number the same area code his parents have. The single private number is his cell phone, which has text messaging capability. He chooses the tags to be used as proxies for their associated public numbers. Because he is the only user of this cell phone, he chooses the outgoing security level=none and puts the outgoing number in the "single button dial" list of his cell phone.

For tag=1 he may choose, for example, voice mail except for weekdays other than national or local holidays from 8:00 AM until 5:00 PM, during which times received calls go to the voice mail with the following message: "Please call back during normal business hours: 8 AM until 5 PM on business days."

For tag=2, he may program the calls to go through from 6 PM until 10 PM on Thursday evenings and from 8 AM until 6 PM on Saturdays. His voice mail message reminds callers that he is available to discuss an upcoming Saturday soccer game. For his elderly parents, who are more comfortable using the same area code as their own, he allows calls through during non-business hours, again with a friendly voice mail message. He is notified by text message to his cell phone of all calls including those that are automatically directed to his voice mail systems. He can always choose to return a call even though it was directed to voice mail.

He sets up speed dial for his most important business clients, his soccer team parents, and his own parents. When he returns calls, it is always through the outgoing number so the CPN always appears on the called number, letting those he calls know that it is he who is calling them. He always knows when a soccer parent calls, no matter where they call from, because his tag is set to 2 and precedes the CPN.

Consider the simplicity and control this system has brought to the use of his cell phone. The user easily handles the three special kinds of calls as well as his immediate family who may have his direct cell phone number, although he may choose another public number for them so that he can change cell phones without having to give everyone his new cell number.

Outgoing calls are simple. To call his parents, the holder would press the single dial button, and when a B sounds, he would enter "3#"; after BBB sounds, he would enter "1#" to dial his parents at home. He can make calls to his soccer parents, because his speed dial is customized to them, and they will return calls to the appropriate public number.

Example 2

A second example and specialized skin is for the holder who wishes to give each new prospective girlfriend a different public number so he can deactivate them at will. The set up would be similar to the prior skin, with the following changes and additions: the timing for the voice mail would affect all public numbers at once. In addition, he may wish a higher level of security in placing outgoing calls. An option would be invoked by the skin to dial automatically if only one speed dial number was associated with a particular public number. The minutes for all public numbers would be aggregated and a charge levied for each change in public number requested by the holder. To simplify marketing and pricing, the user might, for example, be allowed five public numbers.

Consider the case in which each of five public numbers has a single speed dial, and voice mail is activated on all accounts from 10:00 PM until 8:00 AM every day. The SMS messages would inform him of all incoming calls unless he turns off his cell phone.

To call person #4, he dials the outgoing number revealing his CPN, enters "4#" and then his password or pass name. The called number for person #4 would automatically be placed, revealing the appropriate CPN. If the results of his conversation were unsatisfactory, he could deactivate this public number and choose another. The skin would automatically credit unused minutes and make a charge for getting a new public number.

Example 3

A simple dating scenario is presented, using the system and method according to the present invention. Relevant features include:
1) ability to hide personal/private number
2) option to reject anonymous callers (callers with no caller ID)
3) option to reject or bar calls from certain caller IDs
4) ability to turn off, and change the routing of a public number—based on user-defined criteria re time of day or week
5) ability to seed-dial
6) option to record voice mail
7) ability to establish Press 1 to answer the call
8) option to establish multiple public numbers in the same, or in multiple area codes
9) choice of area codes from which to choose Overview There are over three million paying subscribers currently using Internet dating. In the initial stages of a potential relationship, people (especially women) often are reluctant to give out their private phone number to someone whom they don't yet know well. At the same time, they wish to talk to new acquaintances in order to assess the potential for a relationship. In addition, there are over 80 million users of social dating sites such as My Space. Obviously it is very dangerous to publish private phone numbers on the Internet.

In this scenario, the customer selects an area code of his/her choice and is then assigned a local seven-digit number. This new phone number becomes the customer's public number and is linked to his/her existing telephone number (the private number). This private number is never revealed. The assignment of the new public number and link to the private number is instantaneous.

Private numbers may be any telephone number. The system is entirely device and number indifferent. Private numbers may be cellular, home, or business and may be on any telephony device. Customers may determine exactly when and how they wish to receive calls, and can easily cancel or change their public number at any time. Incoming calls can be treated differently based on user desires: calls can be forwarded to voice mail, given a busy signal, or be presented with a "number disconnected" message based on time. Specific caller IDs may be blocked or identified as "unavailable" or "private". Routing can also be based on flexible time-of-day or day-of-the-week functions. The company can provide customers with more than one public number (in different area codes if required) and link each to a single private number, and support multiple private numbers. Calls may be routed based on number origination and other user defined variables.

Speed Dials can be set up for frequently used numbers.

To further ensure anonymity, a separate voice mailbox not associated with the user's public number is provided. For example, the user's normal public mailbox may play the message, "you've reached Jane Doe at Acme Corp," while the alternate mailbox may play, "you've reached Jane".

Lastly, to prevent calls being answered inadvertently, affirmative verification is required when a call is presented. When a call is forwarded to the private number, the user answers it as normal, but then hears the message, "press 1 to accept the call." If the user does not press "1," the call is sent to the alternate voice mail.

Example 4

An embodiment of the system and method according to the present invention appropriate for use by a private investigator is provided. Relevant features include:
  1) All of dating listed above, plus
  2) Change outbound caller ID
  3) Record calls, watermarked for authenticity and send email
  4) Location based service. With email/SMS
  5) Reverse ANI name with email/SMS
  6) Associate a label with a public number
  7) Inbound caller ID options
Overview Private investigators need to conduct confidential investigations where their private phone numbers are not revealed. In addition to the features inherent in example 3 (dating), the professional account holder can change the caller ID as needed as well as record calls that can later be used as evidence. These recorded calls can be emailed or downloaded from the web site. In addition, an email or SMS text message can be sent to report the originating number and, in some cases where the data is available, the name and location of the caller as well.

An optional four-digit label can be used for identifying the public number or case number or any other function desired to be associated with the call. This label can be sent as part of the caller ID string as well as shown in the billing records. For example, 0007 could be used to identify a case in the Washington, D.C., area, and 0001 to designate the first number of several numbers associated with a particular investigation.

The caller ID sent to the phone can be in several forms.
  1) identifying the call generically with the public number
  2) identifying as the originating ANI
  3) identifying as a label previously associated with the public number
  4) combining several of these forms Example 5

An embodiment of the system and method according to the present invention appropriate for use by law enforcement organizations is provided. Relevant features include:
  1) All of private investigator, plus
  2) Secure 2-way, RSA type and/or biometric authentication
  3) Enhanced data encryption
  4) Enhanced operational procedures security
  5) Dedicated, isolated environment:
    telephony server
    database server
    IBIS/application web server
    telephony trunk groups
  6) Distributed/redundant architecture for disaster planning and business continuity
  7) Cascading enforced security permissions and credentials
  8) Enterprise customized pricing plans
Overview Law enforcement organizations and homeland security at all levels (military, federal, state, and local) also need to conduct discrete telephone investigations. They require far greater security and reliability than do commercial applications.

Web based access (and optionally telephony access) will require at a minimum two-way authentication with a changing access key. Biometric information can be used to further secure the environment. As biometric security (speaker identification, etc) becomes more reliable, it will have an increasingly important role in the operation. Call data is encrypted at the earliest possible moment, and systems and procedures are put in place to guard against inadvertent access or disclosure of call information. These users will have their own dedicated, fully distributed equipment as well as isolated telephone trunks. In addition, management at these organizations will be able to set the permissions and access levels of their subordinates.

Example 6

An embodiment of the system and method according to the present invention appropriate for use by an overseas traveler to the US. Relevant features include:
  1) Same feature set as "daters" above, plus
  2) Dual number SIM
Overview Travelers select an area code(s) either before leaving for the United States or upon arrival in the United States. The motivation in such a situation, is not so much to provide privacy as to have a local number in the US, which can be used for the duration of the visit. It would be easier and less expensive for US callers to get in touch with the traveler via a domestic number.

For those travelers using an international GSM phone, this secondary number would also be provided on their SIM, allowing the travelers to roam in the US at domestic rates.

This set-up is at least 50% less expensive than comparable costs of international roaming.

Example 7

An embodiment of the system and method according to the present invention appropriate for implementing a remote business presence is provided. Relevant features include those applicable for a doctor's office.

Overview

For businesses that with to have the convenience of local access to their customers, phone numbers in remote area codes can be provided. What differentiates this service from traditional remote call forwarding (RCF) is that it provides for customer to be called with the local caller ID. Absent this feature, if the business needed to call their customer back, the caller would not recognize the incoming call as being from the same business that was dialed originally.

Example 8

An embodiment of the system and method according to the present invention appropriate for implementing traditional Remote Call Forwarding (RCF) is provided. A customer is in New York—ANI (212) 555 2368. The RCF number is 212 222 2222. A travel agent is in Washington, D.C. (202) 234 5678

- NY customer dials 212 222 2222 and reaches travel agent in Washington.
- Travel agent needs to call NY customer back and dials 212 555 2368.
- NY customer receives the call, but recognizes that the caller ID of 202 234 5678 is not the number he dialed. He is confused and/or doesn't answer—bad for the customer and bad for the travel agent.

RCF in accordance with an embodiment of the present invention. Customer is in New York—ANI (212) 555 2368. The public number 212 222 2222. Travel agent is in Washington, D.C.—private number (202) 234 5678.

- NY customer dials 212 222 2222 and reaches the travel agent in Washington.
- The travel agent needs to call the NY customer back, dials into the system, and then dials 212 555 2368.
- NY customer receives call, recognizes the caller ID (212 222 2222) as the number he dialed beforehand and therefore answers the call—good for the customer and good for the travel agent.

Such functionality could be also obtained based on a VOIP system. A VOIP implementation, however, may be clumsy if there are multiple numbers involved and it requires a fixed location and broadband connection to operate.

Call Flow

A telephone user dials a telephone number under control of system and allocated to the System. The public number will be terminated, for example, at the hardware platform call routing engine which may be in a central office (CO), a point of presence (POP) or other premises.

Basic Call Route—Inbound Calls

Upon receiving the call by the hardware platform, the DNIS of the call is queried to find the number the caller dialed (dialed number). The dialed number has been either allocated to the public number pool of numbers, in which case this is an inbound call or it is used by users customers to initiate calls and/or retrieve voicemails, in which case we refer to it as an outbound call.

If it is determined that the dialed number is not allocated to outbound calls, then the call routing engine database is immediately queried as follows:
1) The public number table is queried for the public number equal to the dialed number.
2) If an appropriate record is not found, then this public number is assumed to be out of service, and the inbound call is rejected with an ISDN out-of-service message.
3) If an appropriate record is found, the public number record is retrieved and public number status is determined based on the value in the status field.
4) If the status shows that this public number is not active for inbound calls, then the inbound call is immediately rejected with an ISDN out-of-service message.
5) If the status shows that this public number is active for inbound calls, the inbound call is taken off hook and a ring-back is played to the caller.

All active public numbers belong to holders and the holder will have configured certain call routing rules for his/her public number. These rules are configured by the holder though a web-based application and held in the call routing database.

The holder can configure the system so that inbound calls made to his/her public number are routed by the system as follows:

Route to the Holder's Private Number

If it is determined from the call treatment field of the public number record that the call should be routed to a telephone number configured by the holder (a private number), then a lookup is performed on the private public number table based on the public number and sequence number fields. This returns a private public number record. The private number field of the private public number record contains the private number currently associated with this public number and a new call (outbound call segment) is initiated to the holder's private number. The caller ID sent with the outbound call segment is also configurable by the holder and might be:
1) The public number
2) The caller ID of the inbound call segment
3) A numeric descriptor previously associated with the public number
4) Some combination of the above When the holder receives the outbound call segment on his private number he/she has the choice of answering the call or ignoring the call.

Holder Answers the Outbound Call Segment

When the holder answers the outbound call segment, the system prompts the holder to press 1 to accept the inbound call. If the holder presses 1, the inbound call and outbound call segment are routed together, connecting the holder to the calling party.

If the holder hangs up without pressing 1, the inbound call is considered rejected, and the outbound call segment is dropped. The on decline action field of the private public number record for this public number is read to determine the next action. It might indicate that the inbound call should be:
1) routed to a voice mail system
2) given a ring-back for a further four minutes and then dropped Holder does not Answer the Outbound Call Segment If the holder does not answer the call, the on no ans action field of the private public number record for this public number is read to determine the next action. If the on no ans action dictates that the system should send the call to the next available private number for this public number, the NA sequence field is checked to determine the sequence number of the next private number. A lookup is then done on the private public number table based on the public number and the private number sequence number. This sequence of events is repeated until all registered private numbers have been exhausted, at which point the number may be sent to voicemail if available.

The holder could also configure the on no ans action field so that the inbound call be sent to voicemail or that ring-no-answer treatment should be given to the inbound call.

Called Party Line is Busy

If the holder's private number is busy, the on busy action field of the private public number record for this public number is read to determine the next action. If the on busy action dictates that the system should send the call to the next available private number for this public number, the busy sequence field is checked to determine the sequence number of the next private number, and a lookup is done on the private public number table based on the public number and this sequence number. This sequence is repeated until all registered private numbers have been exhausted, at which point the number may be sent to voicemail if available.

The on busy action field would ordinarily indicate that the call should be sent to voicemail, however, or that ring-no-answer treatment should be given to the inbound call.

Basic Call Route-Outbound Calls

As stated previously, the DNIS of the any call arriving at the hardware platform equipment is queried to find the number the caller dialed (dialed number). If the dialed number has not been allocated to the public number pool of numbers, it is considered an outbound call being made by an account holder and the following call flow applies:

The private number field of the private public number table is queried with the caller ID associated with the inbound call. Zero or many matches may occur. The system validates both the inbound call and the holder making that call.

Validating the Holder

Three distinct situations are possible: caller ID is associated with single, multiple, or no public numbers.

1) Caller ID Associated with a Single Public Number:

If the caller ID matches a single private number in the private public number table, the public number field is retrieved and the public number table is queried for the unique record associated with the retrieved public number.

Several fields from this public number record are used to validate the caller and to establish whether he/she is the true holder of the public number.
  a) If the security level field indicates high security the caller is challenged to enter a public number and a personal identification number (PIN).
  b) If the security level is medium, the caller is prompted to enter a PIN only.
  c) If the security level is low, the caller is not prompted and the outbound call can proceed. In this case the caller ID alone has validated the holder.

2) Caller ID is Associated with Multiple Public Numbers:

If the private number matches more that one public number in the private public number table—then the caller is prompted to enter a public number or a short code associated with a public number. The private public number and public number tables are queried as follows:
  a) If 10 digits are entered by the caller and these digits match the value in the public number field of a record in the public number table, the public number and caller ID are matched in the private public number table. If found, this public number is then associated with the caller ID.
  b) If fewer than 10 digits are entered by the caller and these digits match the value in the PPNumber Tag field of a record in the public number table, the relevant public number and caller ID are matched in the private public number table. If found, then this public number is associated with the caller ID.

If either of these two queries returns a valid public number, the security level for the public number is retrieved. If the security level field indicates high security or medium security, the caller is prompted for a PIN. If the security level is low, the caller is not prompted for a PIN and the outbound call can proceed.

3) Caller ID is Associated with no Public Numbers:

If the caller's caller ID does not match any private number in the private public number table, the caller is prompted to enter a public number. (Note: short codes are not allowed from unrecognized caller ID's.) The digits entered are compared with the public number field in the public number table. If a match is found, the security level is retrieved. This security setting dictates how the call proceeds as follows:
  a) High: outbound calls for this public number cannot be made from an unrecognized caller ID, and the call is refused.
  b) Medium: outbound calls for this public number can be made from an unrecognized caller ID, but the caller must enter a valid private number and PIN.
  c) Low: outbound calls for this public number can be made from an unrecognized caller ID, but the caller must enter a valid PIN only.

If validated, the outbound call can then move to the next stage of the call flow.

Getting the Number to Call

Once the public number is validated, the number to call needs to be established. The caller, now validated as the holder, is prompted to enter the number to call. He/she can take the following actions:
  1) The holder enters the 10-digit number to dial.
  2) The holder enters a previously user-configured two-digit speed dial number that maps to a 10-digit number.
  3) The caller enters # followed by a two-digit code that performs one of several user account functions (covered elsewhere in this document) on the user account.

If the caller enters a two-digit speed dial number, the speed dial table is then queried, and the relevant 10-digit number is retrieved. If the user enters 10 digits, his/her number is used directly. These 10 digits represent the outbound number to dial.

This number to dial is checked against a number exception table to ensure that it is not specifically disallowed. The digits representing the area code are also checked to ensure that outbound calls to these areas are allowed.

Outbound Caller ID

The feature set field of the relevant public number record in the public number table is checked to establish what caller ID should be associated with the outbound call as follows:
  1) Caller ID should be the public number.
  2) Caller ID should be any 10 digits entered by the caller making the outbound call. If the outbound caller ID can be overridden, the user is prompted to enter a 10-digit number. This number is then checked against an exception table, to ensure that the caller ID is not specifically disallowed. If it is allowed, the 10 digits are used as the outbound caller ID. If it is disallowed, the caller is informed.

Call Recording

The feature set value is checked again to see if call recording is enabled; if so, the outbound call is recorded.

Public Number Configuration

Many features of the system are configurable by the user, both through a website and through the telephony system itself. When making an outbound call using his/her public number, the holder can enter * followed by # to enter the configuration menu and perform the following configuration options:

1) Query the system for the current treatment being given to inbound calls to the holder's public number.
2) Change the treatment given to those inbound calls as follows:
   a) Send to a private number.
   b) Send to voice-mail.
   c) Give continuous ring-back for an extended duration.
   d) Give a busy tone.
   e) Give a fast busy tone.
   f) Give an out-of-service message.
3) Retrieve voice-mails left for that public number.
4) Retrieve recordings of any inbound and outbound calls recorded by the system for that public number.
5) Configure prompt levels played to the holder during outbound calls. Prompt levels include verbose, brief, and 'bong' (where a series of tones are played instead of spoken prompts).

The above configurations can also be performed using a dedicated web-based application (web-site) along with the following additional configurations:

1) Add additional public numbers to a holder's account
2) Associate a meaningful label to the public number, for easy identification
3) Associate a public number tag with the public number.
4) Configure the caller ID sent with an outbound call.
5) Configure the caller ID sent with an inbound call (original caller ID, public number, public number tag or combination).
6) Configure speed-dial numbers.
7) Listen to and configure call recordings.
8) Listen to and configure voice-mails.
9) View call activity records.
10) Set default security levels and passwords.
11) Enter email and SMS address to receive notifications of calls and/or voice mails received.
12) Block anonymous calls to the public number.
13) Block the public number from specific caller Ids.

Scaling to a Large Number of Users

One of the problems inherent with complex telephony processing is how to make a system work well in large-scale implementations. Traditional applications could be: either simple and run on large mainframe class telephone switches, however for complex environments they normally run on soft switches. They could also be complex and run on server-based (Dialogic or equivalent) systems. While currently implemented using TDM PRIs Dialogic cards in a telephony grade sever, this solution will only scale, at best, into several thousand simultaneous calls. Further, the fully loaded cost per port becomes prohibitive.

Major and Tier 2 carriers have numerous existing deployed switches around the nation, complete with robust SS7 implementations. Some of those switches support Discordia specification GR-1299-CORE, AINGR: Switch-Service Control Point (SCP)/Adjunct Interface. This is a vendor-independent set of features that can be implemented as an add-on optional module available on all major switches. In addition, several hardware vendors have implemented proprietary versions of the essentially the same feature or comparable sets.

Regardless of whether the features exist in a GR1299 or vendor-specific house feature set, a preferred embodiment of the present invention will utilize these capabilities. This requires at least one switch on the network to be so enabled. By adding a single SS7 SCP onto the carrier network, the following advantages are provided compared with switching at a customer's premises or POP:

leverage of existing carrier infrastructure
    reduced capital and maintenance costs
    inherently redundant and distributed SS7—hence a more reliable architecture
    well proven design
    significantly lower price per port
    high scalability
    implementation of call routing via database queries within the SCP
    minimal impact on existing carrier operations
    SCP-controlled trunk groups-isolating network risks and minimizing the cost and time of extensive trunking.

On-Line Database

The System preferably employs databases for: card control, billing (for general accounts and professional accounts), pen data (for professional accounts), logs (system errors, customer errors, call records, and billing records), and on-line control. Both voice and web components of the System may use the same databases. These databases are, for example, interrelated and straightforward except for the on-line control database. This section details the on-line control database as well as the logic of accessing this database.

This database structure is designed for efficient use by the on-line system. This database can be used to interface directly with SS7 used internally on large telephone switches. It is necessary to use a database capable of supporting "persistent views". This is required for two reasons. First, access to the required information must be immediate on receiving incoming calls; there is typically no time for a complex "join" operation. Timing is still important but not as critical in placing outgoing calls. Second, there is a many-to-many relationship, that is, each public number may have up to seven associated private numbers and each private number may be associated with a large number of public numbers. Most of the accounts may have a single private number associated with a single public number; however, the structure preferably is available to accommodate all cases.

It is preferable to keep the tables in the on-line databases small in size in order to improve the speed of the system. A complete set of these tables is associated with each outgoing number. Therefore, it is important to distribute outgoing numbers carefully. Outgoing numbers can be specific to a particular skin; that is, the skin is automatically assumed by placing a call to a particular outgoing number. Outgoing numbers are preferably limited to a particular number of telephone calling cards. Select professional accounts may be given their own outgoing numbers.

The system preferably employs databases for: card control, billing (for general accounts and professional accounts), pen data (for professional accounts), logs (system errors, customer errors, call records, and billing records), and on-line control. Both voice and web components of the System may use the same databases. These databases are, for example, interrelated and straightforward except for the on-line control database. This section details the on-line control database as well as the logic of accessing this database.

This database structure is designed for efficient use by the on-line system. This database can be used to interface directly with SS7 used internally on large telephone switches. It is necessary to use a database capable of supporting "persistent views". This is required for two reasons. First, access to the required information must be immediate on receiving incoming calls; there is typically no time for a complex "join" operation. Timing is still important but not as critical in placing outgoing calls. Second, there is a many-to-many relationship, that is, each public number may have up to seven associated private numbers and each private number may be associated with a large number of public numbers. Most of the accounts may have a single private number associated with a single public number; however, the structure preferably is available to accommodate all cases.

It is preferable to keep the tables in the on-line databases small in size in order to improve the speed of the system. A complete set of these tables is associated with each outgoing number. Therefore, it is important to distribute outgoing numbers carefully. Outgoing numbers can be specific to a particular skin; that is, the skin is automatically assumed by placing a call to a particular outgoing number. Outgoing numbers are preferably limited to a particular number of telephone calling cards. Select professional accounts may be given their own outgoing numbers.

Pen Data

Pen data may be sent to an individual email address as well as to the private number being rung as an option available for an ordinary skin. This assumes that the private number entered is a cell phone capable of receiving text messages. The situation for professional accounts is much more complex in that there are three different times that pen data is sent: initial, intermediate, and final. Each time it can be sent to each of three cell phones, three fax machines, and three email addresses. Professional pen data contains additional items as listed below. The same data is sent whether by SMS, email, or fax. Pen data is also recorded for outgoing calls from a professional account and can be accessed via a web interface.

Example 9

An embodiment of the system and method according to the present invention appropriate for use in a doctor's office/work from home/traveling salesperson/executive
Relevant Features:

Set the office phone number as the permanent caller ID. This means that calls made by the holder from any telephone number to the outbound line will have the same, consistent, caller ID.

Overview

It is often a requirement for office based professionals to make calls to clients from their home or wireless telephone. In this situation, they are forced to either block their outgoing caller ID, in which case the call might go unanswered, or reveal their personal private home or cell phone number. Further reducing call completion rates are the new services telecom carriers now offer to screen calls with caller ID designated as "private" or "number unavailable" such that they do not even ring the called party.

For example, a doctor might have a reason to call a patient after hours from home, but he does not want these calls to be returned to his home phone or wireless number. All patient related calls may typically be made to his office or the hospital, for proper distribution to the doctor on duty.

The solution allows the doctor to purchase a public number and permanently fix the outgoing caller ANI to the office or hospital number. When the doctor uses the system to call from home (or indeed anywhere using his cell phone), through our outbound number, the caller ID associated with the outgoing call will then be the appropriate number, as revealed by the caller ID, thus ensuring the call is answered by the recipient and that the doctor's personal private number is never revealed.

Example 10

An embodiment of the system and method according to the present invention appropriate for implementing a classified advertisements response service. Relevant features include:

1) Hides the personal/private number
2) This also gives a special treatment to all calls returned to the public number When the product is sold or no longer available, the seller simply turns off the public number.

Overview

In placing a classified advertisement it is often necessary to use a telephone number so any potential buyer can call for more details of the item on sale.

For instance, when advertising an apartment for rent, potential tenants might call to make an appointment to view the apartment. If these calls simply go to a recording device, it is easier to lose a client.

This solution allows the seller to purchase a public number, in the area code of his choosing. Via a dedicated web-site, the seller can control at what time of day calls made to the public number, are sent to his cell phone, and when they are sent to voicemail.

This gives the seller the control to receive calls at a time convenient to him and still leave his cell phone available to take personal, non-apartment related calls.

Any calls made to potential purchases can be made using the system, and the public number will show as the Caller ID to the called party, in this case the potential buyer. This affords the seller privacy.

Rental advertisements can generate a tremendous response that continues well after the apartment has been rented. Our solution allows an advertiser to send all calls to an out-of-service message, once the sale is over. Optionally, a polite notice can be played, informing callers that the apartment is no longer available. This frees up the seller's cell phone for personal calls, saves cell phone usage charges and again, never reveals the sellers private number.

After a reasonable amount of time, the caller can 'turn-off', and stop paying for the public number, and all caller's will receive an out-of-service message.

Example 11

An embodiment of the system and method according to the present invention appropriate for implementing a virtual outgoing call center. Relevant features include:

1) Hides the personal/private number
2) Records each Call.
3) Speed-dial all outbound calls from home-based offices.

Overview

There is an increasing trend to use off-premise, home-based workers to perform tasks which were traditionally only done by staff physically located in large call centers.

The Internet has hastened this trend by allowing organizations to easily and securely distribute the company's data to anywhere in the world with Internet access. Extending phone systems out to off-premise locations remains an expensive and less than ideal solution however. Extending premise-based out-bound call facilities is even more difficult.

Using our solution, home based company representatives can use their existing phones, to initiate outbound calls on behalf of their employer, without ever revealing their home telephone number to the called party. A caller ID, chosen by the company, will be associated with all outbound calls. This is particularly important as these workers typically work on different "campaigns" for different clients, where it becomes necessary to display the correct caller ID associated with a given campaign.

A solution according to the present invention provides valuable metrics including the number of calls each agent makes, length of each call etc., and can collect from the agent the result of each call, or any other customized information.

This system allows recording of calls and retrieval of these calls for staff training and quality assurance purposes.

The foregoing disclosure of embodiments and exemplary applications of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Table Name: Public Number

| Column Name | Type | Request | Description |
| --- | --- | --- | --- |
| Row ID | ui | | Unique identifier |
| Public Number | char (10) | PK | Public number |
| Trunk ID | char (10) | | Trunk ID - for SIP |
| Account Number | char (20) | | Depreciated |
| Account # | int | FK | Account number of holder |
| Status | char (10) | | Public number status. Possible values are: Active for incoming and outgoing calls; Active for incoming calls; Active for outgoing calls; Active for configuration only; Not active; Retired; Not yet used |
| Status Date | date, time | | The date the status last changed |
| Treatment | char (2) | | The current treatment given to inbound calls. Possible options are: Route to private number; Route to voicemail; Give ring-no-answer; Give busy; Give fast busy; Give out of service |
| Initial Sequence | char (10) | | This is the initial sequence number—normally 1. It points to the private number in the private public number table. That private number will receive any inbound calls to this public number. |
| PPNumber Tag | char (10) | | A user-defined short code for the public number. |
| Password | char (20) | | A user-defined password for the public number. |
| Default Security Level | char (10) | | Defines the security level implemented when making a call using this public number. |
| Default Initial Message | char (10) | | Not currently used |
| Default Prompt Profile | char (10) | | Defines which prompt the user hears when using this public number. |
| Feature Set | char (10) | | Each character represents a feature turned on or off 1. Records calls enabled 2. Password required 3. Caller ID Override enabled 4. Voicemail |
| SMS Address | char (30) | | The SMS Address used to send SMS messages to the cell phone |
| Email Address | char (30) | | The email address to which call recording, associated with this public number, is sent |

Table Name: Private/Public Number          Namespace: PPN IVR
This table defines the relationship between the private and public numbers and the calling private number sequence for inbound calls.

| Column Name | Type | Request | Description |
| --- | --- | --- | --- |
| Row ID | ui | | Unique identifier |
| Public Number | char (10) | PK | Public number |
| Sequence Number | char (2) | PK | The current sequence number. A sequence number of 1 means the private number associated with this record will receive all inbound calls. Only 1 record can exist with same public number and a sequence number of 1. All other occurrences of the private number in this table will have a sequence other than 1. |

-continued

Table Name: Private/Public Number    Namespace: PPN IVR
This table defines the relationship between the private and public numbers and the calling private number sequence for inbound calls.

| Column Name | Type | Req. | Description |
|---|---|---|---|
| Private Number | char (10) | PK | The private number. |
| Status | char (2) | | The status of this public/private number association. |
| On Busy Action | char (2) | | This determines what to do with the inbound call when the private number is busy. |
| Busy Sequence | char (2) | | If the call is sent to another private number, this determines the sequence number. |
| On No Answer Action | char (2) | | This determines what to do with the inbound call when the private number does not answer. |
| NA Sequence | char (2) | | If the call is sent to another private number, this determines the sequence number. |
| On Decline Action | char (2) | | This determines what to do with the inbound call when the recipient declines to take the call. |

| Column Name | Type | Req. | Description |
|---|---|---|---|
| Row ID | ui | Y | Unique identifier created for this record by system. |
| Call ID | int | Y | Unique identifier created for this call. |
| Time Stamp | timestamp | | Date and time this record was created (binary format). |
| Date Time | char (30) | | Date and time this record was created (readable format). |
| Originating Number | char (30) | | Originating number—the ANI or caller ID of the call. It might be the private number on an outbound call. |
| Destination Number | char (30) | | Destination number. On an inbound call this represents the private number, with a sequence number 1, associated with the public number. On an outbound call this could represent the number to dial or a voicemail number. |
| Transaction Type (Trans Type) | char (30) | | Possible values: call received call routed call released email sent SMS sent More values will be added. |
| Trunk Number | char (10) | | Trunk used for this call. |
| Port Number | char (10) | | Port used for this call. |
| Call Type | char (20) | | Possible values: inbound outbound VM retrieval More values will be added. |
| Account Number | int | | Account number currently associated with public number. |
| Public Number | char (20) | | Public number associated with this call. |
| Private Number | char (20) | | Private number, with a sequence number 1, associated with the public number. |
| Called Number | char (20) | | Number called to access the service. For an inbound call this is the DNIS, the 1-877 number. For an inbound call it is the DID that represents the public number. |
| Email Address | char (30) | | The email address used in an email sent transaction. |
| SMS Address | char (30) | | The SMS address used in a SMS sent transaction. |
| Call Segment | int | | Call segment associated with this CDR. There will be any number of call segments associated with a single call. |
| Off Hook Duration | int | | Amount of time in seconds that this call has been off hook. |
| Status | char (10) | | Current status of the public number—i.e., active, inactive, suspended. |
| Call Treatment | char (2) | | Call treatment given to this call. |
| Debug Notes | n text | | System Field: other system information. |
| Version | char (2) | | System Field: the version of CDR record structure. |
| Version 1 Call ID | char (30) | | System Field: the caller used in version 1 |

Table Name: CDR Summary   Namespace: PPN IVR
This is the summary table maintained by the system. Each record in the CDR Summary table should be derivable from the individual CDR records of each call. It is useful to have this table during development and testing.

| Column Name | Type | Request | Description |
| --- | --- | --- | --- |
| Call ID | int | Y | PK This is the unique identifier for this call. |
| Start Time | date time | | This is the date and time this record was created. |
| End Time | date time | | This is the date and time this record was last updated. |
| Total Duration | int | | This is the calculated total duration of all segments associated with this call. |
| ANI | char (10) | | This is the ANI or caller ID of the inbound segment of the call. It might be the unknown caller ID, a private number, or a public number. |
| Call Type | char (10) | | Possible values: inbound outbound |
| Account # | int | | This is the account number currently associated with the public number. |
| Public Number | char (10) | | This is the public number. |
| Call Treatment | char (2) | | This is the call treatment given to the call. |
| Private Number | char (10) | | This is the private number, with sequence 1, associated with the call. |
| DNIS | char (10) | | This is the number the caller called to access the service. For an outbound call this is the DNIS, the 1-877 number. For an inbound call it is the DID that represents the public number. |
| Version | Char (2) | | System field: the version of CDR record structure. |
| Version 1 Call ID | char (30) | | System field: the call ID used in version 1 of the CDR table. |

Table Name: Fraud Summary   Namespace: PPN IVR

| Column Name | Type | Request | Description |
| --- | --- | --- | --- |
| Row ID | ui | | Unique identifier |
| Public Number | char (10) | | PK |
| Total Calls | int | | |
| Total Minutes | int | | |
| Total Allowed Minutes | int | | |

Table Name: Account   Namespace: PPN web

| Column Name | Type | Request | Description |
| --- | --- | --- | --- |
| Row ID | ui | | Unique identifier |
| Account Number | char (20) | | Unchecked |
| Account # | int | | Unchecked |
| Title | char (10) | | |
| First Name | char (20) | | |
| Last Name | char (20) | | |
| Address Line 1 | char (30) | | |
| Address Line 2 | char (30) | | |
| City | char (30) | | |
| State | char (10) | | |
| ZIP | char (10) | | |
| Contact Phone 1 | char (15) | | |
| Contact Phone 2 | char (15) | | |
| Email Address | char (30) | | Business email (not used to send call records, etc.) |

Simple pen data in sequence sent to holder if the data is available:

tag
Name from reverse telephone lookup
City, state, country (if not US)
From = CPN
To = public number
Time
Date
Pen data in sequence sent to professional holder if available:

tag
Name from reverse telephone lookup
City, state, country (if not US)
From = CPN
To = public number
Listed = name from CPI if possible
Message status = first, intermediate, or final.
Additional database items on intermediate and final messages Private = private number (holder optional)
Time
Date
Duration of call on final message

What is claimed is:

1. A method for operating a voice communications network by a voice communications system having a database, comprising:

storing on the database in a private public number table a first association between a private number of a user and a plurality of public numbers of a voice communication network, wherein the private number is controlled by the user, and wherein the plurality of public numbers are provided by the voice communications system;

creating a second association between a first telephone number with a first public number of said plurality of public numbers;

authenticating the user of the private number without reliance on a static reproducible data code;

receiving an incoming call to the first public number from the first telephone number of a calling party, and routing the incoming call to the private number;

receiving an outgoing call from the private number to an outgoing number, wherein the outgoing number is associated with the voice communications system;

validating the outgoing call by identifying the private number and using the identified private number to query the private public number table stored on the database for the first association;

upon validation of the outgoing call, receiving from the user of the private number a selection of the first public number from the plurality of public numbers;

receiving from the user an input of the first telephone number to call;

routing the outgoing call to the first telephone number;

transmitting the first public number as calling party information to a communication device associated with the first telephone number; and altering the second association between the first telephone number and the first public number.

2. A method for operating a voice communications network by a voice communications system having a database, comprising:

dynamically associating and storing on the database in a private public number table as a first association at least one private number of a user with a plurality of public numbers of a voice communication network, according to a predetermined algorithm, wherein the private number is controlled by the user, and wherein the plurality of public numbers are provided by the voice communications system;

storing a second association between a first telephone number and a first public number of said plurality of public numbers;

receiving an incoming call to said first public number from a communication device associated with the first telephone number of a calling party, and routing the incoming call to at least one of said private numbers;

receiving an outgoing call from said at least one private number to an outgoing number, wherein said outgoing number is associated with said voice communications system;

validating the outgoing call by identifying the at least one private number and using the identified at least one private number to query the private public number table stored on the database for the first association;

upon validation of the outgoing call, receiving from the user of the at least one private number a selection of the first public number from the plurality of public numbers;

receiving from the user an input of the first telephone number to call;

passing the outgoing call to said communication device associated with the first telephone number;

transmitting calling party information of said first public number to said communication device; and altering said second association of said first telephone number and said first public number.

3. The method according to claim 2, wherein an outcome of said predetermined algorithm is sensitive to at least one of a time, a communication status, an external status, accounting information, system congestion, communication cost, and a location.

4. The method according to claim 2, further comprising the step of verifying a validity of an association of a public number and a private number.

5. The method according to claim 2, further comprising the step of receiving a user input to influence said dynamic association.

6. The method according to claim 2, further comprising the step of determining a status of at least one of said private numbers, and associating in dependence on said determined status.

7. The method according to claim 2, further comprising the step of providing an automated storage facility as at least one of said at least one private number.

8. The method according to claim 2, further comprising the step of providing a user interface facilitating receipt of configuration information from a second communication device associated with said at least one private number, said configuration information influencing said dynamic association.

9. The method according to claim 2, further comprising providing an interactive voice response interface for at least one of a user at a public number and a user at a private number.

10. The method according to claim 2, further comprising the step of authenticating a user.

11. The method according to claim 2, further comprising the step of authenticating a user without reliance on a static reproducible data code.

12. The method according to claim 2, further comprising the step of authenticating a user biometrically.

13. The method according to claim 2, further comprising the step of authenticating a user based on a cryptographic key which changes over time or after use.

14. The method according to claim 2, further comprising the step of logging communications involving at least one private number.

15. A method for operating a voice communications system, comprising:

providing a first option set for dynamically associating a plurality of private numbers with a plurality of public numbers of a voice communication network, according to a first predetermined algorithm, for connecting with at least one of a plurality of first communication devices of a user, wherein the plurality of private numbers are controlled by the user, and wherein the plurality of public numbers are provided by the voice communications system, wherein each private number of the plurality of private numbers is associated with a sequence number indicating in which sequence the voice communications system should contact the user at the plurality of private numbers;

providing a second option set for dynamically associating a first public number of said plurality of public numbers with a telephone number associated with a second communication device of a voice communication network, according to a second predetermined algorithm, for permitting at least one of the plurality of first communication devices of the user to contact the second communication device, wherein the first public number is transmitted as calling party information to the second communication device;

providing a third option set for defining functions available if a call to at least one of the first communication devices of the user is not completed, wherein said third option set comprises sending the call to a next available private number of the plurality of private numbers based on the sequence number if the call to the at least one of the first communication devices is not completed; and defining a restricted option space within each of the first option set, second option set, and third option set, for controlling system behavior, the restricted option space having at least two option sets, each option set differently controlling the system, and being selectively applied to the first communication device.

16. A voice communications system, comprising:
an input receiving an incoming call from a communication device of an external party to a first public number of a plurality of public numbers of a user;
an output generating an outgoing call from a private number of the user, wherein the private number is controlled by the user and wherein the plurality of public numbers are provided by the voice communications system; and
a processor routing said incoming call from the first public number to a communication device of the user associated with the private number and transmitting for display on the communication device of user as calling party information a telephone number associated with the communication device of the external party with an added tag identifying the first public number, and passing said outgoing call from said private number to a telephone number of said communication device of said external party through an outgoing number, wherein said outgoing number is associated with said voice communications system, transmitting for display on the communication device of the external party as calling party information said first public number, creating a first association between the private number with the plurality of public numbers of a voice communication network, and creating a second association between the telephone number associated with said communication device of said external party with said first public number of the plurality of public numbers, according to a predetermined algorithm, and altering said first association of said private number and said first public number.

17. The system according to claim 16, wherein an outcome of said predetermined algorithm is sensitive to at least one of a time, a communication status, an external status, accounting information, system congestion, communication cost, and a location.

18. The system according to claim 16, said processor verifies a validity of said first and said second associations.

19. The system according to claim 16, wherein said processor receives a user input to influence each of said first and said second association.

20. The system according to claim 16, wherein said processor determines a status of said at least one of said private numbers, and creates the first association in dependence on said determined status.

21. The system according to claim 16, wherein said at least one private number is stored in an automated storage facility.

22. The system according to claim 16, further comprising a user interface for facilitating receipt of configuration information from a second communication device associated with said at least one private number, said configuration information influencing at least one of said first or said second associations.

23. The system according to claim 16, further comprising an interactive voice response interface for receiving voice input from at least one of a user at a public number and a user at a private number.

24. The system according to claim 16, wherein a user associated with said system is authenticated.

25. The system according to claim 16, wherein a user is authenticated without reliance on a static reproducible data code.

26. The system according to claim 16, wherein a user is authenticated biometrically.

27. The system according to claim 16, wherein a user is authenticated based on a cryptographic key which changes over time or after use.

28. The system according to claim 16, wherein a communication for said at least one private number is logged.

29. A method for operating a voice communications network by a voice communications system, comprising:
dynamically associating and storing as a first association a private number associated with a first communication device with a plurality of public numbers of a voice communication network, wherein the private number is controlled by a user and wherein the plurality of public numbers are provided by the voice communications system;
storing a second association between a telephone number associated with a second communication device and a first public number of said plurality of public numbers;
receiving an incoming call to the first public number from the second communication device, routing the incoming call to of said first communication device associated with the private number, and transmitting to the first communication device as calling party information the telephone number associated with the second communication device with an added tag identifying the first public number for display by the first communication device;
receiving an outgoing call from said private number to an outgoing number, wherein said outgoing number is associated with said voice communications system, receiving from the user an input of the telephone number associated with the second communication device to call, passing the outgoing call to said second communication device, and transmitting as calling party information said first public number to said second communication device for display by the second communication device.

30. A method for operating a voice communications network by a voice communications system, comprising:
storing a first association between a private number associated with a first communication device and a plurality of public numbers, wherein the private number is controlled by a user and wherein the plurality of public numbers are provided by the voice communications system;
receiving an incoming call to a first public number of the plurality of public numbers from a second communication device, routing the incoming call to the first communication device, and transmitting to the first communication device for display as calling party information a telephone number associated with the second communication device with an added tag identifying the first public number; and receiving an outgoing call from the private number to an outgoing number, wherein said outgoing number is associated with said voice communications system, receiving a first selection from the first communication device of a public number from the plurality of public numbers, receiving a second selection from the first communication device of a telephone number to call, associating the selected public number with the telephone number to call, routing the outgoing call to the telephone number to call, and transmitting for display the selected public number as a calling party information to a communication device associated with the telephone number to call.

* * * * *